United States Patent Office 2,721,870
Patented Oct. 25, 1955

2,721,870

2,5-DI-(HYDROXY METHYL) THIOPHENES

Herman Pines, Chicago, Ill., assignor to Universal Oil Products Company, Chicago, Ill., a corporation of Delaware No Drawing. Application February 29, 1952, Serial No. 274,301

2 Claims. (Cl. 260—332.3)

This application is a continuation-in-part of my copending application Serial Number 719,128, filed December 28, 1946, now abandoned.

This invention relates to bis-2,5-(hydroxymethyl)-thiophenes and to certain derivatives thereof.

In the preparation of the compounds of this invention, a suitable thiophenic compound is first chloromethylated to form a di-(chloromethyl)-thiophene which is then hydrolyzed to produce the bis-2,5-(hydroxymethyl)-thiophene.

Thiophenic starting compounds for the production of di-(hydroxymethyl)-thiophenes may be represented by the general formula:

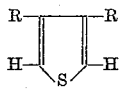

in which R consists of hydrogen, alkyl, cycloalkyl, aryl, alkaryl, bicycloalkyl, etc., groups. These hydrocarbon substituents may have one or more of their hydrogen atoms substituted by halogen atoms such as fluorine, chlorine, bromine, etc., or by nitro groups, sulfo groups, mercapto groups, aceto groups, etc. R may also consist of a halogen atom, such as fluorine, chlorine, bromine, etc., or may represent a nitro group, sulfo group, mercapto group, amino group, etc.

The thiophenic compounds which are useful as starting materials for the production of the novel compositions of matter of the present invention may be prepared in any suitable manner. In one such manner, a suitably substituted succinic acid, suitably substituted 4-oxo-butanoic acid, or a suitably substituted succinaldehyde is reacted with a sulfide of phosphorus such as $P_2S_3$ or $P_4S_3$, and ring closure is obtained with the resultant production of the desired substituted thiophene. In general, 1,4-ketones may be used in this synthesis which may be represented by the following general equation:

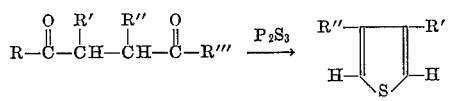

R and R''' in the above equation are hydrogen or hydroxy, and R' and R'' are hydrogen, alkyl, cycloalkyl, aryl, alkaryl, bicycloalkyl, etc. As hereinbefore set forth, R' and R'' may also be a halogen atom, a nitro group, sulfo group, mercapto group, amino group, etc.

The following compounds are to be considered merely representative of thiophenic compounds within the scope of the present invention which are suitable starting materials for the production of di-(hydroxymethyl)-thiophenes but are not given with the intention of unduly limiting the scope thereof: thiophene, 3-methylthiophene, 3-ethylthiophene, 3-propylthiophene, 3-n-butylthiophene, 3-iso-butylthiophene, 3-sec-butylthiophene, 3-tert-butylthiophene, 3-amylthiophene, 3-hexylthiophene, 3-heptylthiophene, 3-octylthiophene, 3-nonylthiophene, 3-decylthiophene, 3-undecylthiophene, 3-dodecylthiophene, etc.; 3-cyclopentylthiophene, 3-methylcyclopentylthiophene, 3-cyclohexylthiophene, 3-methylcyclohexylthiophene, etc.; 3-phenylthiophene, 3-tolylthiophene, 3-xylylthiophene, 3-ethylphenylthiophene, etc.; 3,4-dimethylthiophene, 3-methyl-4-ethylthiophene, 3-methyl-4-propylthiophene, 3-methyl-4-n-butylthiophene, 3-methyl-4-iso-butylthiophene, 3-methyl-4-sec-butylthiophene, 3-methyl-4-tert-butylthiophene, 3-methyl-4-amylthiophene, 3-methyl-4-hexylthiophene, 3-methyl-4-heptylthiophene, 3-methyl-4-octylthiophene, 3-methyl-4-nonylthiophene, 3-methyl-4-decylthiophene, 3-methyl-4-undecylthiophene, 3-methyl-4-dodecylthiophene, etc., 3,4-diethylthiophene, 3-ethyl-4-propylthiophene, 3-ethyl-4-butylthiophene, 3-ethyl-4-amylthiophene, 3-ethyl-4-hexylthiophene, 3-ethyl-4-heptylthiophene, 3-ethyl-4-octylthiophene, 3-ethyl-4-nonylthiophene, etc., 3,4-dipropylthiophene, 3-propyl-4-butylthiophene, 3-propyl-4-amylthiophene, 3-propyl-4-hexylthiophene, 3-propyl-4-heptylthiophene, etc., 3,4-dibutylthiophene, 3-butyl-4-amylthiophene, 3-butyl-4-hexylthiophene, etc., 3,4-di-amylthiophene, 3-amyl-4-hexythiophene, etc., 3,4-di-hexylthiophene, etc.; 3,4-dicyclopentylthiophene, 3,4-di-(methylcyclopentyl) - thiophene, 3,4 - di - cyclohexylthiophene, 3,4-di-(methylcyclohexyl)-thiophene, 3-cyclopentyl-4-methylcyclopentylthiophene, 3-cyclopentyl-4-cyclohexylthiophene, 3 - cyclopentyl - 4 - methylcyclohexylthiophene, 3 - methylcyclopentyl - 4 - cyclohexylthiophene, 3 - methyl-cyclopentyl-4-methylcyclohexylthiophene, 3-cyclohexyl-4-methylcyclohexylthiophene, etc.; 3,4-diphenylthiophene, 3,4-dinaphthylthiophene, 3,4-di-tolylthiophene, 3,4-di-xylylthiophene, 3-phenyl-4-naphthylthiophene, 3-phenyl-4-tolylthiophene, 3-phenyl-4-xylylthiophene, 3-naphthyl-4-tolylthiophene, etc.; 3-methyl-4-cyclopentylthiophene, 3-methyl-4-cyclohexylthiophene, etc., 3-methyl-4-phenylthiophene, 3-methyl-4-tolylthiophene, etc., 3-cyclohexyl-4-phenylthiophene, etc. Other compounds within the scope of the present invention include 3-fluorothiophene, 3-chlorothiophene, 3-bromothiophene, etc., 3,4-di-fluorothiophene, 3,4-di-chlorothiophene, 3,4-di-bromothiophene, 3,4-di-iodothiophene, 3-fluoro-4-chlorothiophene, 3-fluoro-4-bromothiophene, 3-fluoro-4-iodothiophene, 3-chloro-4-bromothiophene, 3-chloro-4-iodothiophene, and 3-bromo-4-iodothiophene. Examples of other compounds include: 3-nitrothiophene, 3-sulfothiophene, 3-mercaptothiophene, 3-aminothiophene, 3,4-di-nitrothiophene, 3,4-di-sulfothiophene, 3,4-di-mercaptothiophene, 3,4-diaminothiophene, etc.

Formaldehyde is another constituent of the reaction mixture employed in the preparation of novel compositions of matter in the present invention. This aldehyde can be used in solutions in the form of commercial aqueous formaldehyde containing 37% by weight of HCHO or in the form of its polymers such as trioxymethylene (sometimes called metaformaldehyde) and also as paraformaldehyde.

While catalysts are not essential to the reaction for the preparation of the compounds of the present invention, the chloromethylation reaction is sometimes facilitated by the presence of acid-acting catalysts including mineral acids and metal halides. Of the mineral acids, sulfuric acid and phosphoric acid are particularly effective, hydrogen fluoride is used sometimes, and the preferred metal halides include aluminum chloride, bismuth chloride, zirconium chloride, stannic chloride, zinc chloride, and boron trifluoride.

The operating temperatures used in carrying out the chloromethylation reaction are from about −30° to about 200° C., and preferably from about −20° to about 100° C. The particular temperature used in a given chloromethylation reaction depends upon the concentration of the hydrochloride acid used, the reactivity of the thiophene compound charged, the nature of the catalyst used, if any, and the form of the aldehyde compound charged to the process, that is, whether formaldehyde or a polymer thereof is used.

In the second step of the preparation of some of the novel compounds of the present invention, a di-(chloromethyl)-thiophene is hydrolyzed by heating with water or an aqueous alkaline solution including an aqueous solution of a hydroxide of an alkali metal, an alkaline earth metal, magnesium hydroxide, etc., to replace the chlorine atoms of the chloromethyl group by a hydroxy group thus forming di-(hydroxymethyl)-thiophene compounds. The temperature used in the hydrolysis depends upon the di-chloromethylated thiophene used and the basic component added to the water. Usually, temperatures from 160–250° C. are desired, although temperatures from 100–325° C. may be employed.

The chloromethylation reaction may be carried out in either batch or in continuous operation. In batch type treatment, a suitable thiophenic compound, formaldehyde or a polymer thereof, and hydrochloric acid or hydrogen chloride are contacted in an autoclave or other suitable equipment in which the temperature can be controlled by external heating or cooling. Such a reactor is usually provided with a stirrer or other means of agitation in order to effect intimate contacting of the different constituents of the reaction mixture. After the chloromethylation reaction has reached a desired degree of completion, the resultant reaction products are then discharged from the batch type reactor and separated by suitable means, as by distillation, and unconverted or incompletely converted reactants are added to the material charged in a later run.

The di-chloromethylated compounds so formed are then commingled with an aqueous solution of an alkali or other suitable hydrolyzing medium and heated in a batch type reactor for a time sufficient to convert the di-chloromethylated thiophene compounds into di-hydroxymethylated thiophene compounds.

Continuous operation for the preparation of the compounds of the present invention is generally preferred. This may be effected by introducing a suitable thiophene compound, formaldehyde or a polymer thereof and hydrochloric acid into a suitable reactor containing baffles or a granular packing material, the latter being used either as a reactor filling material or as a support for a metal halide catalyst or other acid acting catalysts. The rectants are then charged to the chloromethylation zone at a suitable rate in order to effect the desired degree of chloromethylation of the charged thiophenic compound. The resultant reaction products are then subjected to suitable separating treatment to recover chloromethyl-, and di-(chloromethyl)-thiophenic compounds. The chloromethylthiophene compounds are then recycled to the process in order to form higher yields of the di-(chloromethylated)-thiophenic compounds.

The hydrolysis of di-chloromethylated thiophenic compounds is illustrated by the following equation which shows the hydrolysis of bis-2,5-(chloromethyl)-thiophene into a new glycol, namely, bis-2,5-(hydroxymethyl)-thiophene.

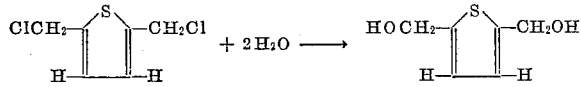

Other di-(hydroxymethyl)-thiophenes may be produced similarly from the di-(chloromethyl)-derivatives of substituted thiophenes particularly those having a hydrocarbon or halogen substituent, as hereinbefore set forth, combined with the carbon atoms in the 3 and 4 position of the thiophene ring, that is, the carbon atoms that are not combined with the sulfur atom of the thiophene ring.

Bis-2,5-(hydroxymethyl)-thiophenes are useful as intermediates in organic syntheses and in the production of medicinals, plastics, resins, insecticides, etc. Thus, glycols of this type can be reacted poly-functional compounds such as diols, triols, dihalides, dibasic acids, tribasic acids, other polybasic acids, etc., to form useful high molecular weight compounds.

The following example is introduced to illustrate the process of preparing the compounds of my invention, but it should not be misconstrued to limit unduly its generally broad scope.

525 grams of hydrochloric acid containing 37% by weight of hydrogen chloride and 117 grams of trioxymethylene were placed in a glass-lined reactor and stirred at a maximum temperature of 11.5° C. while 126 grams of thiophene was added dropwise thereto during a time of 5.5 hours. The resultant reaction product was then transferred to a separatory funnel, pentane was added to cause the organic product to float and the lower aqueous layer was withdrawn from the separatory funnel. The aqueous layer so withdrawn was extracted with pentane and the pentane extract was added to the organic product which was washed with sodium carbonate to neutralize the hydrochloric acid present, then washed six times with water to remove unreacted formaldehyde and dried over potassium carbonate. After distilling off most of the pentane and unreacted thiophene at atmospheric pressures, the remainder of the product was distilled at sub-atmospheric pressure. A small amount of potassium carbonate was added to the material being distilled in order to prevent excessive decomposition during distillation. The yields of chloromethylated thiophenes based upon the thiophene charged were 15.8% of monochloromethylthiophene and 12.7% of dichloromethylated thiophene. The bis-2,5-(chloromethyl)-thiophene boils at 106–108° C./5 mm. The di-chloromethylthiophene, mostly 2,5-di-chloromethylthiophene, was refluxed with dilute caustic soda solution until there was no chlorine in the organic product which consisted essentially of 2,5-di-(hydroxymethyl)-thiophene together with some higher boiling condensation products. The bis-2,5-(hydroxymethyl)-thiophene boils at 162–166° C./<1 mm.

The nature of the present invention and results obtained thereby are evident from the preceding specification and example, although neither section should be misconstrued to limit unduly the generally broad scope of the invention.

I claim as my invention:

1. A bis-2,5-(hydroxymethyl)-thiophene having in each of the 3 and 4 positions a member of the group consisting of hydrogen, halogen and alkyl.

2. Bis-2,5-(hydroxymethyl)-thiophene.

References Cited in the file of this patent

UNITED STATES PATENTS 2,425,721    Blicke _____ Aug. 19, 1947

OTHER REFERENCES

Griffing et al., J. Am. Chem. Soc., vol. 70, pp. 3416–8 (1948).

Steinkopf, Ann. 532, 277, 279, 281 (1937).